J. L. CREVELING.
ELECTRIC REGULATION.
APPLICATION FILED SEPT. 16, 1910. RENEWED APR. 2, 1912.
1,058,731.
Patented Apr. 15, 1913.
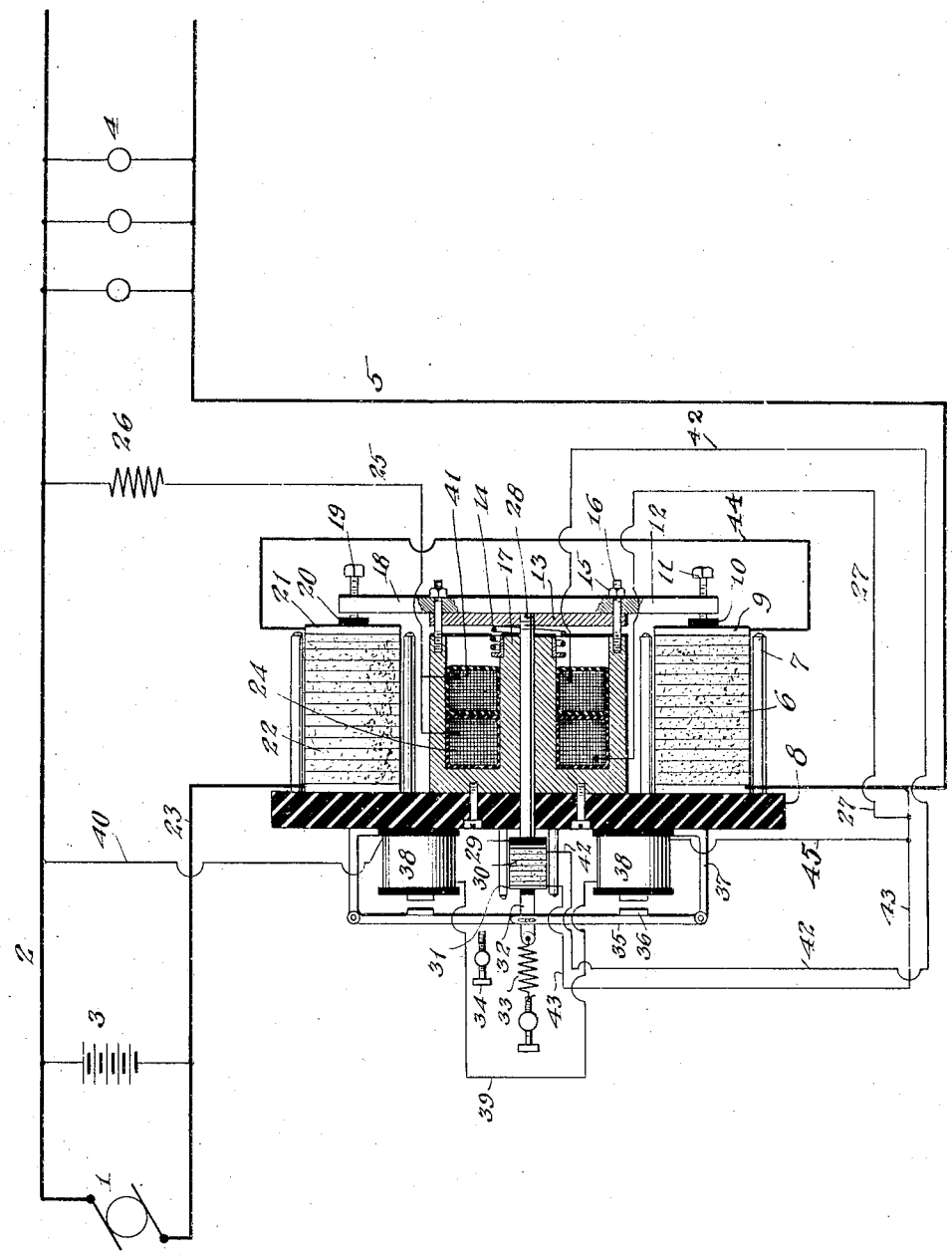
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,058,731. Specification of Letters Patent. Patented Apr. 15, 1913.

Application filed September 16, 1910, Serial No. 582,284. Renewed April 2, 1912. Serial No. 688,030.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate an electric circuit in response to changes tending to take place within a circuit.

My invention has for its particular object to provide means whereby the current in a circuit, or the voltage across a circuit, may be automatically governed in a pre-determined manner.

As my invention is particularly applicable to systems of electrical distribution wherein it is desired to hold a constant voltage on a translation circuit throughout changes in the voltage at the source from which same is supplied, it will be described with reference to such a system.

The drawing is a diagrammatic representation of one type of system embodying my invention.

In the drawing, 1, represents a dynamo or generator, the positive terminal of which is connected as by lead 2 with the positive side of storage battery 3, and lamps or other translating devices 4. The negative side of the translating devices is connected with the main 5, which is led to one end of the carbon pile 6, the opposite end of which is in electrical communication with the contact member 9, connected as by wire 44 with the contact member 21, in electrical communication with one end of the carbon pile 22, the opposite end of which is connected as by lead 23 with the negative side of the storage battery 3 and generator 1. The carbon piles 6 and 22 are supported as by insulating rods 7, carried by the base 8, preferably made of insulating material. Contact member 9 is carried by the insulating bushing 10, engaging the screw 11, threaded into the arm 12, carried by the armature 13, of iron or other magnetic material. The spring 14 tends to move the armature 13 in a right-handed direction, and the limit of motion that may be given to the armature is adjusted as by nuts 15, threaded upon the guide rods 16, of brass or other non-magnetic material.

17 represents the field frame of an electro-magnet which, when excited, tends to attract the armature 13 against the action of the spring 14. The armature 13 is also provided with the arm 18 carrying an adjustable screw 19, engaging insulating bushing 20, which carries the contact member 21 in electrical communication with the carbon pile 22.

24 is a winding upon the magnet frame 17, having one end connected as by wire 25 with the lead 2 through the resistance 26. The other end of the winding 24 is connected as by wire 27 with the main 5.

28 represents a rod of brass, or other non-magnetic material screw-threaded into the armature 13, and passing through the magnet core 17 and base 8 in such manner as to be free to move therethrough. The rod 28 carries the insulating member 29 in contact with one end of the small carbon pile 30, the opposite end of which communicates with the contact member 31, carried by the post 32 and insulated therefrom as shown.

33 is an adjustable spring tending to move the members 31 and 32 in a left-handed direction, and 34 is an adjustable screw for limiting the motion that can be given by the spring 33. The member 32 is pivotally connected with the levers 35, carrying armatures 36 and supported as by brackets 37 in operative relation to the magnets 38, the said magnets 38 being connected in series with each other as by the wire 39, and across the lead 2 and main 5, as by wires 40 and 45.

41 is a winding upon the magnet frame 17, having one end connected with the wire 25, and the opposite end connected as by wire 42 with one end of the carbon pile 30. The opposite end of the said carbon pile 30, is connected as by wire 43 with main 5. The coils or windings 24 and 41 are wound in such directions that when energized they tend to set up magneto-motive forces opposed to each other.

The operation of my invention is substantially as follows:—If the generator be operating and its voltage be sufficient to supply current both to the battery and to the translation circuit, current will flow from the lead 2 to battery 3, and return to generator through lead 23. Current will also flow through the translating devices 4 to main 5 and thence through carbon pile 6 to member 9, thence through wire 44 to member 21; thence through carbon pile 22 and lead 23 to the generator. Therefore, the voltage impressed upon the translating devices 4 will depend upon the resistance of the carbon piles 6 and 22 in series with the translation circuit, and the resistance of the said carbon piles will depend upon the pressure exerted upon the same by the magnet 17—24—41. Current will flow from the main 2 through resistance 26, wire 25, winding 24 and wire 27 to the main 5 and thus tend to energize the magnet 17—24 and attract the armature 13 so as to compress the carbon piles 6 and 32 and reduce the resistance thereof to a minimum. Current will also tend to flow from the wire 25 through winding 41, wire 42, carbon pile 30 and wire 43 to the lead 5 in a reverse direction to that of the coil 24, and thus tend to weaken the effect of the same and lessen the pressure upon the carbon piles 6 and 22, and increase the resistance thereof. The current shunted away from the coil 24 and diverted through the opposing coil 41 will depend upon the resistance of the carbon pile 30, which in turn will depend upon the pressure exerted upon said carbon pile 30 by the magnets 38. The current flowing from the lead 2 through wire 40, magnets 38 and wire 45 to the main 5, will depend upon the voltage across the translation circuit and will tend to cause the magnets 38 to attract the armatures 36 and move the levers 35 against the action of spring 33 in such a manner as to compact the carbon pile 30 and reduce the resistance thereof, and thus weaken the effect of the winding 24 and increase the effect of the opposing winding 41; and I so adjust the spring 33 that when the normal voltage is reached upon the translation circuit, any increase above this voltage will cause the magnets 38 to move the armatures 36 against the action of spring 33 so as to reduce the resistance 30 and weaken the winding 24 and strengthen the winding 41, so as to weaken the pull upon the armature 13 and lessen the pressure upon carbon piles 6 and 22 so as to increase the resistance of the translation circuit and thus restore the normal voltage. If the voltage fall below the normal, the current in the magnets 38 will decrease and spring 33 will lessen the pressure upon the carbon pile 30 and increase the resistance thereof, which will cause the magnet 17—24—41 to exert a greater pull upon the armature 13 and thus increase the pressure upon the carbon piles 6 and 22, and decrease the resistance thereof, so as to tend to hold the voltage upon the translation circuit constant.

In practice I make the air gap between the magnet frame 17 and the armature 13 small, as it is desired to exert a heavy pressure upon the piles 6 and 22, and it is only necessary that the said armature should have a very slight travel throughout its range of operation. The motion given the armature 13 is transmitted by means of the rod 28 to one end of the carbon pile 30 in such manner that if the magnets 38 are slightly weakened so as to increase resistance 30, which action will cause the armature 13 to be attracted and drawn in a left-handed direction, the rod 28 will move the member 29 in a left-handed direction, so as to tend to again compact the carbons 30 and thus reduce the resistance thereof and check the above-mentioned action in such manner as will obviously prevent hunting.

I have described my invention with reference to a system wherein it is desired to hold the voltage upon a circuit constant. It will be obvious that the same is equally applicable for use in holding the current in a circuit constant, the only changes necessary being, that the actuating magnets 38 shall be series magnets in the circuit to be governed, rather than shunt magnets across the circuit.

I do not wish in any way to limit myself to the exact details of construction or exact mode of operation set forth in the specification and drawing, inasmuch as the same are given merely as an illustration of one type of apparatus or system, embodying my invention, which is set forth in the following claims:—

1. Means for regulating an electric circuit comprehending a resistance varying element, electro-magnetic means tending to reduce the resistance thereof, means for controlling said electro-magnetic means, comprehending a variable resistance affected by the operation of said electro-magnetic means and means whereby decrease of said variable resistance tends to increase the first-named resistance and electro-magnetic means for governing the last-named resistance.

2. Means for regulating an electric circuit comprehending a resistance varying element, electro-magnetic means for controlling said element including means tending to reduce the resistance thereof, electromagnetic means tending to counteract the effect of the last named means, a variable resistance governing the resultant strength of said electro-magnetic means, and means whereby the combined effect of said electro-magnetic means tends to vary the said variable resistance and electro-magnetic means for controlling the said variable resistance.

3. Means for regulating an electric circuit comprehending current controlling means, electro-magnetic means for governing the same comprising a plurality of windings, a variable resistance for governing the operating effect of said plurality of windings, means whereby the effect produced by said windings tends to alter said variable resistance and electro-magnetic means for governing said variable resistance.

4. Means for regulating an electric circuit comprehending a regulating element, the regulating effect of which is varied by variations in pressure thereupon, electro-magnetic means for controlling said element including means tending to increase the pressure thereupon, electromagnetic means tending to counteract the effect of the last named means, means for governing the mutual effective operation of said electro-magnetic means affected by the operation of said magnetic means and electro-magnetic means for controlling said governing means.

5. Means for regulating an electric circuit comprehending a circuit controlling element, electro-magnetic means for controlling the same comprising an electro-magnet comprising opposed windings and an armature separated by a narrow air gap, a variable resistance for controlling the operation of said electro-magnetic means, means affected by the motion of said armature tending to vary said resistance and electro-magnetic means for governing said resistance.

6. Means for regulating an electric circuit comprehending a carbon pile, electro-magnetic means for exerting pressure thereupon, a variable resistance governing said electromagnetic means, means whereby said electromagnetic means in reducing the resistance of the said carbon pile also tends to reduce said resistance and electro-magnetic means for controlling said resistance.

7. Means for regulating an electric circuit comprehending a resistance varying element, electromagnetic means for controlling said element comprehending a winding tending to reduce the resistance thereof, a winding tending to counteract the effect of the last named winding, means for controlling the resultant effect of said windings affected by the operation thereof and means responsive to fluctuations in the circuit regulated for controlling said last named means.

8. Means for regulating an electric circuit comprehending a circuit regulating element, electromagnetic means for controlling the same comprising an electromagnet having opposed windings and an armature, a variable resistance for controlling the current in said opposed windings, means whereby said resistance is affected by motion of said armature and electromagnetic means for controlling said resistance.

9. Means for regulating an electric circuit comprehending a carbon pile, means for electro-magnetically exerting pressure thereupon, a variable resistance governing said electro-magnetic means and having its value reduced by motion affecting compression upon the carbon pile and electro-magnetic means for controlling said resistance.

10. Means for regulating an electric circuit comprehending a carbon pile, electromagnetically operated means exerting pressure thereupon, a variable resistance governing said electromagnetic means and having its value reduced upon compression of the carbon pile and electro-magnetic means responsive to fluctuations in the circuit to be controlled and affecting said resistance.

JOHN L. CREVELING.

Witnesses:
CHAS. McC. CHAPMAN,
M. HERSKOVITZ.